Sept. 23, 1958     C. H. CAST     2,852,847
PIPE INTERSECTION DELINEATING APPARATUS
Filed April 27, 1953     4 Sheets-Sheet 1
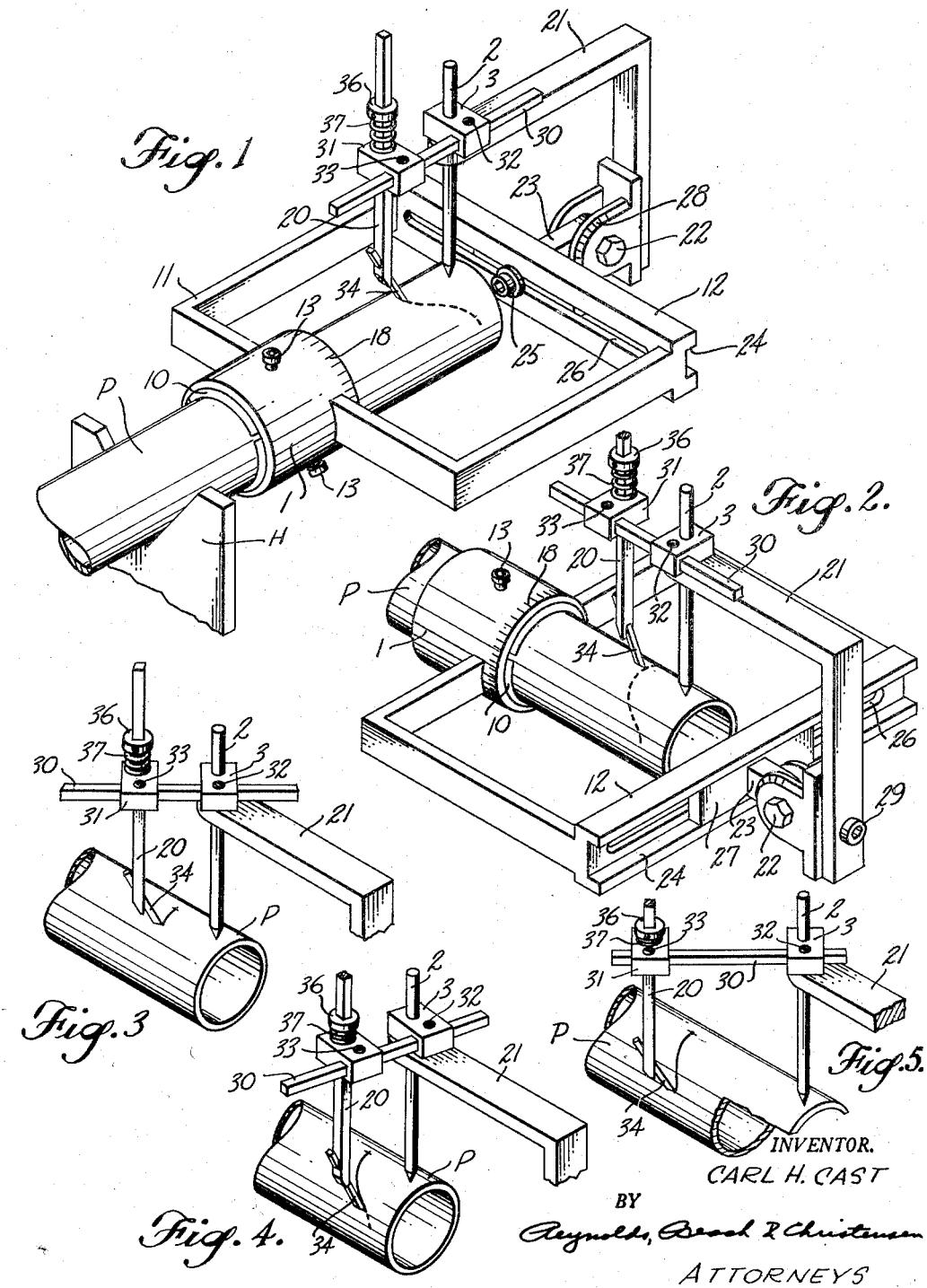
INVENTOR.
CARL H. CAST
BY
Reynolds, Beach & Christensen
ATTORNEYS Sept. 23, 1958  C. H. CAST  2,852,847
PIPE INTERSECTION DELINEATING APPARATUS
Filed April 27, 1953  4 Sheets-Sheet 2

INVENTOR.
CARL H. CAST
BY
Reynolds, Beach & Christensen
ATTORNEYS

Sept. 23, 1958        C. H. CAST        2,852,847
PIPE INTERSECTION DELINEATING APPARATUS
Filed April 27, 1953        4 Sheets-Sheet 3
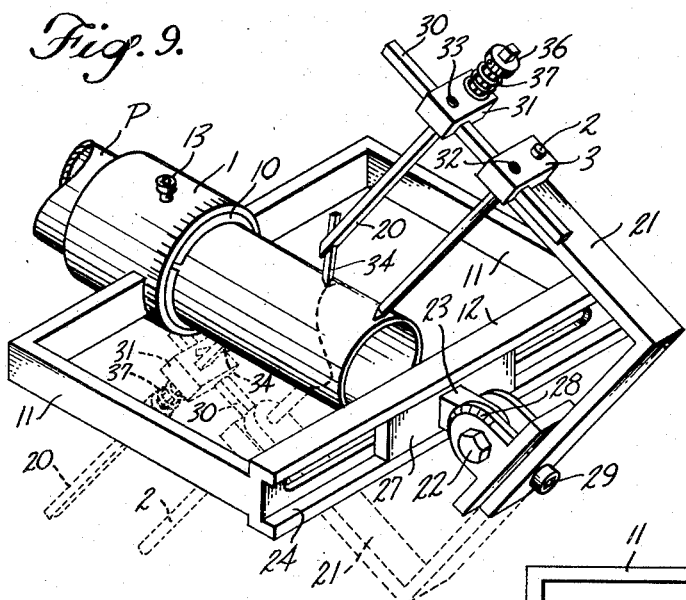
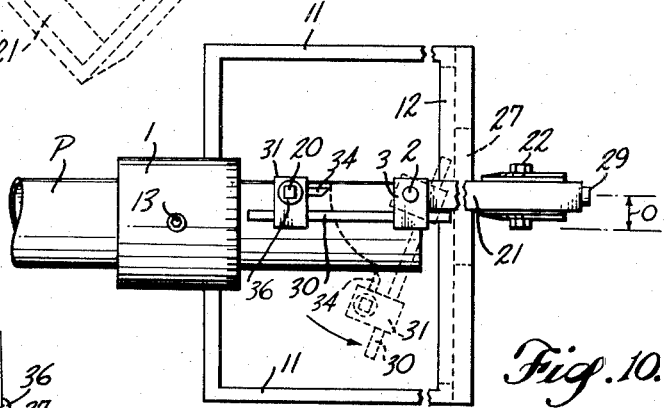
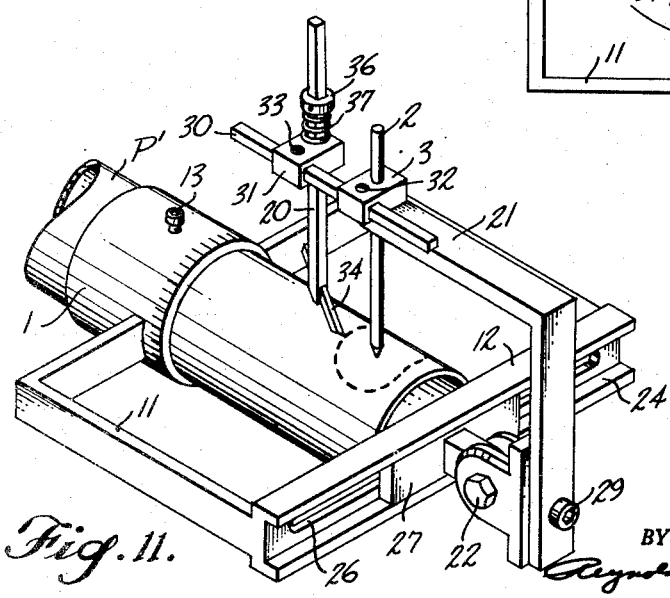
INVENTOR.
CARL H. CAST
BY
Reynolds, Beach & Christensen
ATTORNEYS

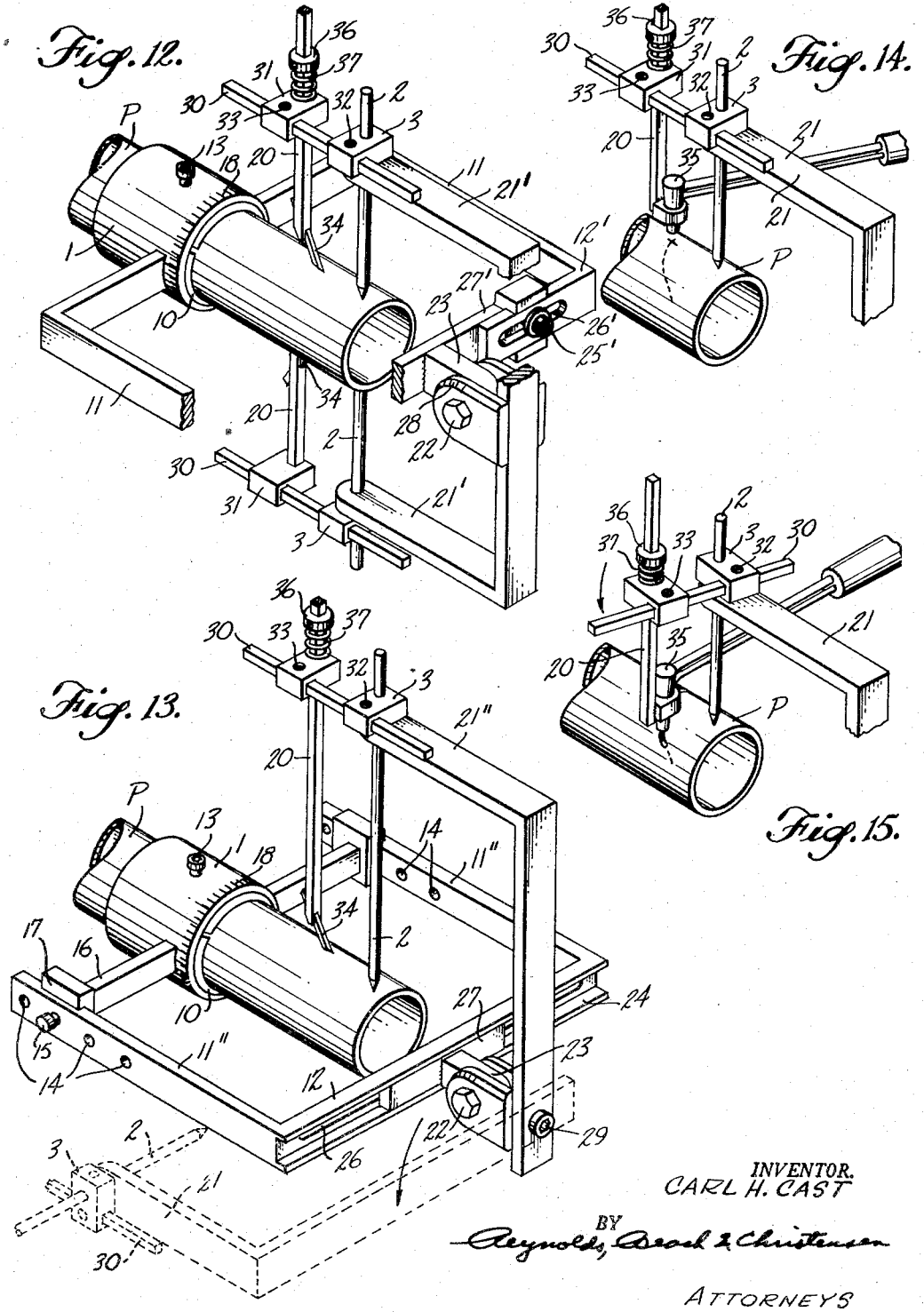

United States Patent Office 2,852,847
Patented Sept. 23, 1958

2,852,847

PIPE INTERSECTION DELINEATING APPARATUS

Carl H. Cast, Seattle, Wash., assignor to Boeing Airplane Company, Seattle, Wash., a corporation of Delaware Application April 27, 1953, Serial No. 351,100

16 Claims. (Cl. 33—21)

The apparatus of the present invention is used to delineate the line of a pipe intersection either by scribing such a line or by actually cutting the pipe along the line of intersection. Such apparatus is intended to designate the intersection particularly on pipes of circular cross section, although it can be used for delineating the line of intersection on pipes of oval, rectangular or other cross-sectional shapes.

A principal object of the present invention is to avoid the necessity of computing the location of a pipe intersection such as by laying out the intersection line on a flat template and then bending the template about the pipe and marking the pipe in conformity with the template. On the contrary, the apparatus can be mounted directly upon a pipe to be scribed or cut along a line of intersection, and while thus mounted the apparatus may be adjusted in accordance with the type of pipe intersection, set in the proper position relative to the pipe and manipulated to mark or sever the pipe along the line of intersection desired.

A further object of the present invention is to provide an apparatus for delineating a pipe intersection which can be adjusted for thus delineating the line of intersection on either of the pipes to be joined, and for an intersection of such pipes where their axes intersect perpendicularly, where such axes intersect at an angle other than perpendicular, where the axes of the respective pipes are offset but are disposed in relatively perpendicular planes, or where the axes of the pipes are offset and such axes are not disposed respectively in relatively perpendicular planes.

A further object is to provide apparatus which can either scribe a line of intersection or actually sever the pipe along the line of intersection such as by moving a cutting torch along such line.

The present invention may be incorporated in apparatus of different types, several forms being shown in the accompanying drawings, incorporating features which enable the apparatus to be secured quickly on the pipe, which may be adapted easily to fit pipes of different size, and which may be shifted quickly to scribe intersections of various contour on either side of the pipe.

In general the apparatus includes a pipe-engaging member supporting a yoke on which the delineating apparatus is mounted. Such apparatus may be shifted transversely and lengthwise of the pipe and may be swung about axes one extending lengthwise of the pipe, a second extending transversely of the pipe and a third extending transversely of the pipe in a plane perpendicular to the first-mentioned transverse axis. The delineating element, whether a scriber, a cutting torch or other element, may be moved or adjusted about these various axes to follow the desired intersecting line.

Advantages in the structure and operation of the delineating apparatus of the types shown in the drawings are discussed in the following detailed description.

Figure 1 is a top perspective view of pipe intersection delineating apparatus of the present invention, and Figure 2 also is a top perspective view of such apparatus but taken at 90° to the view of Figure 1.

Figure 3 is a fragmentary top perspective view corresponding to Figure 2 of a portion of the apparatus showing parts in a different adjusted position, Figure 4 is a similar view with parts in a further adjusted position, and Figure 5 is a similar view with parts of the apparatus shown in still a different adjusted position.

Figure 9 is a top perspective view of the apparatus corresponding to Figure 2, but with parts adjusted to delineate a pipe intersection formed between pipes having their center lines intersecting at an angle other than perpendicular.

Figure 10 is a plan view of the apparatus adjusted to delineate the intersection between pipes whose axes are offset from each other but are disposed in planes mutually perpendicular.

Figure 11 is a top perspective view of the apparatus adjusted to delineate the intersection on a pipe to which a pipe end of the shape scribed in Figures 1 to 4, for example, would be fitted.

Figure 12 is a top perspective view of a modified form of delineating apparatus, parts of which are broken away.

Figure 13 is a top perspective view of still a different form of pipe intersection delineating apparatus.

Figure 14 is a fragmentary top perspective view of a portion of the apparatus seen in Figure 2, except that a cutting torch has been substituted for a scribe. Figure 15 is a similar fragmentary top perspective view showing the parts in a different position.

Figure 6:
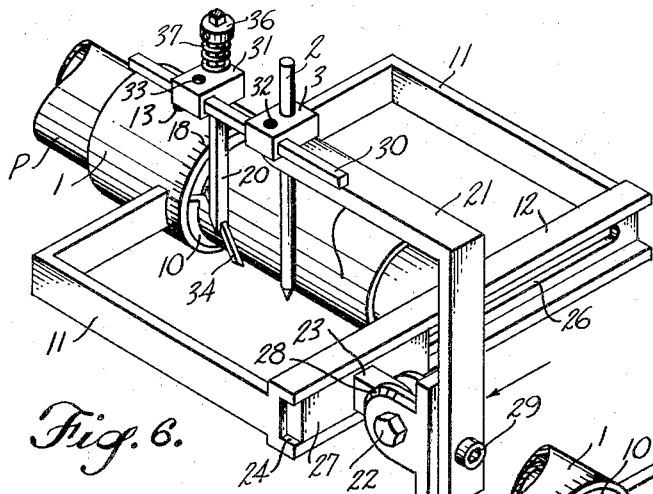
Figure 6 and Figure 7 are top perspective views of the apparatus corresponding to the view shown in Figure 2, but with parts of the apparatus shown shifted to different positions assumed during operation of the apparatus.

In an intersection of pipes having curved cross sections, such as being circular, the edges of the pipes forming the junction are curved irrespective of the angular or positional relationship of the pipes. Moreover, the curvature of a pipe end incorporated in such a joint is usually of the compound type, that is the curvature reverses as the abutting end of the pipe is traced. In a T connection the pipe running through will have an aperture in its side of more or less elliptical shape.

In laying out even a perpendicular T pipe joint where the axes intersect, therefore, it is particularly difficult to generate the curvature of the abutting end of the branch pipe.

It is possible to lay out the contour of the branch pipe's abutting end developed on a flat sheet by geometric and mathematical process and then to wrap the resulting template around the branch pipe and mark the contour of the pipe end from such a template. Since the curvature varies with the sizes of pipe being used and the shape is different for branches at different angles and locations from the through pipe, it would be necessary to expend considerable time in developing mathematically the required shape of abutting end in each instance or to provide a large number of templates for a variety of situations. Not only is the mathematical development of such templates a tedious process, but the average plumbing or sheet metal workman would find it difficult to lay out such a template accurately for all situations.

With apparatus of the type illustrated in the drawings, the proper shape of joining edges is developed on the pipe itself and the apparatus may be adjusted to correspond to virtually any type of pipe joint without great difficulty. The delineating apparatus is supported directly upon the pipe P to be incorporated in the joint, such as by a collar 1 large enough to fit over a pipe of the maximum size for which the apparatus is to be used. Between the pipe P and the collar 1 may be inserted arcuate shims or spacer blocks 10 of a thickness depending upon the difference in diameter between the pipe and the collar. Assuming that the collar and pipe are both of circular cross section, the spacers 10 will be of circular arcuate shape, but the pipe P could be of elliptical cross section while the collar 1 is circular and the spacers in that instance could be of varying thickness appropriate to fill the space between the collar and the pipe as might be necessary.

A generally planar yoke 11 includes two coplanar yoke portions projecting oppositely outward beyond opposite sides of and mounted independently on the collar 1 to straddle the pipe and carries a crossbar 12 extending substantially diametrically transversely across the end of the pipe. The opposite legs of the yoke are of a length to space apart the collar and the crossbar a distance sufficient to enable the contour of the joint to be delineated between them. In order to establish the contour of the end of a branch pipe for abutting the side of a through pipe, the plane of the yoke 11 will be disposed parallel to and preferably coincident with the axis of the through pipe, and such axis will be represented by a reference element or reference axis element at one side of the plane of the yoke shown as the pointer 2. The collar 1 will be fixed relative to pipe P to maintain the yoke in such relationship relative to that pipe by set screws 13 threaded into the collar and extending through apertures in the spacers 10 to engage the pipe P or pressing such spacers into clamping engagement with the pipe.

The delineating element 20 and the pointer 2 are carried by the end of a bracket 21 overhanging the space within the yoke 11. This bracket is supported swingably by pivot 22 from a boss 23 projecting from crossbar 12 in a direction away from the collar 1. As shown by a comparison of Figures 2 and 9 the axis of pivot 22 is disposed parallel to crossbar 12 and perpendicular to the length of pipe P. This boss is adjustable lengthwise of the crossbar 12, such as being secured in a groove 24 by a bolt 25 extending through and slidable along a slot 26 extending along such crossbar. The boss 23 may be integral with a sliding block 27 received in the groove 24 of crossbar 12 beyond the end of pipe P which will hold the boss 23 against rotation so that the pivot 22 will be held parallel to the plane of the yoke 11 and preferably will be located in a diametral plane extending axially of pipe P. When such block is located centrally of the crossbar as shown in Figure 2 the pivot 22 will be in registry with pipe P. The axis of swing defined by pivot 22 thus always perpendicularly intersects the longitudinal axis of pipe P in whatever adjusted position lengthwise of crossbar 12 the sliding block 27 may be, as represented by Figure 2 and Figure 6, for example. In tilting about pivot 22, the delineating element 20 and the reference pointer 2 therefore tilt about an axis disposed diametrically of pipe P.

The pointer 2 may be slidable snugly in an aperture in the end of bracket 21 overhanging the central portion of the space within yoke 11 so that the pointer may be moved lengthwise toward and away from the pipe P. It may carry integral with it a block 3 which is apertured to receive a spreader bar 30 extending perpendicular to the pointer. This bar in turn carries a block 31 apertured to receive the delineating element 20 disposed perpendicular to the spreader bar 30 and parallel to the pointer 2. The spacing between blocks 3 and 31 may be adjusted such as by securing one or both of such blocks to the spreader bar 30 by a set screw. In the structure illustrated the block 3 is secured to the spreader bar 30 by the set screw 32 and the block 31 is secured to such bar by the set screw 33.

In Figures 1 to 13 inclusive the delineating element is illustrated as the scribe 34, whereas in Figures 14 and 15 such element is shown as a burning torch 35 for actually severing the pipe to form an edge to be joined. In either event the delineating element bar 20 is constructed suitably to hold the particular instrument for delineating the shape of the joining edge. The bar 20 is supported for lengthwise movement through block 31 for a distance at least equal to the radius of the pipe to which the delineating mechanism is anchored and preferably the bar is mounted for resilient movement in this fashion. For this purpose the end of the bar remote from pipe P may have a head 36 and a compression spiral spring 37 is received between and bears against the block 31 and head 36 normally to hold the bar in a position retracted from the pipe.

The method of using the delineating mechanism is illustrated in the various views of the drawings. Perhaps the simplest application is for delineating the end of a branch pipe which is to abut a through pipe in a case where the axes of the two pipes intersect perpendicularly and the pipes are of the same size. In such a situation the pointer 2 represents the axis of the through pipe and the spacing of blocks 3 and 31 will be set so that the distance between the point of the pointer 2 and the point of the scribe 34 will be equal to the outside radius of the through pipe. The bracket 21 will be positioned about its pivot 22 so that the pointer 2 is perpendicular to the axis of the branch pipe P, and the block 27 will be adjusted along groove 24 of crossbar 12 so that the axis of pointer 2 is disposed coplanar with the axis of branch pipe P.

With the bracket 21 thus positioned, the pointer 2 will be moved lengthwise through the bracket end until the point of scribe 34 is in engagement with the surface of the pipe or nearly so. The point of pointer 2 also will be in engagement with the pipe at such time, although such disposition serves only as a convenience for checking the setting of the apparatus because the principal reason for the projection of pointer 2 being approximately equal to the projection of the point of scribe 34 from the spreader bar 30 is to enable the point of the scribe to be set easily and accurately a distance equal to the radius of the through pipe from the axis of the pointer. An index 28 on the bracket 21 in the nature of a protractor having its center at the axis of pivot 22 and cooperating with an index line on boss 23 will enable the bracket 21 to be set easily so that the axis of pointer 2 is exactly perpendicular to the axis of pipe P.

With the delineating apparatus thus set on the pipe the head 36 of bar 20 may be pressed to engage the point of scribe 34 firmly with the periphery of the pipe P, and such pressure is maintained while the spreader bar 30 is swung through 90° in each direction from the position shown in Figures 1 and 2, parallel to the axis of pipe P about the axis of pointer 2. Figure 3 shows the bar 30 swung through an angle of approximately 30° in one direction, and Figure 4 shows the bar nearing the completion of its 90° swing in the same direction. The line scratched by the point of the scribe will delineate the intersection line of the branch pipe on the pipe surface. It will be evident that as the bar 30 departs farther from its position parallel to the axis of pipe P, bar 20 will be moved downward in order to maintain contact of the point of the scribe with the surface of the pipe in opposition to the force of spring 37. Upon release of pressure on the head 36 the spring will retract bar 20 to its position illustrated in Figures 1 and 2.

If the branch pipe P is of smaller diameter than the through pipe, the spacing between blocks 3 and 31 must be increased until the spacing between the point of pointer 21 and the point of the scribe 34 will be equal to the outside radius of the larger through pipe. The blocks have been shown as thus adjusted in Figure 5 where the diameter of the through pipe is somewhat more than twice as great as the diameter of the branch pipe P. The bracket 21 is positioned as before and the spreader bar 30 is swung about pointer 2 while pressure is maintained on the head 36 of bar 20 to depress it for maintaining the point of scribe 34 in contact with the surface of pipe P. Because of the greater distance between the points of the pointer 2 and of the scribe 34, it will not be necessary to swing the spreader bar through 90° each side of its position parallel with the axis of the pipe P in order to mark fully the intersection line on the pipe.

Figure 7:
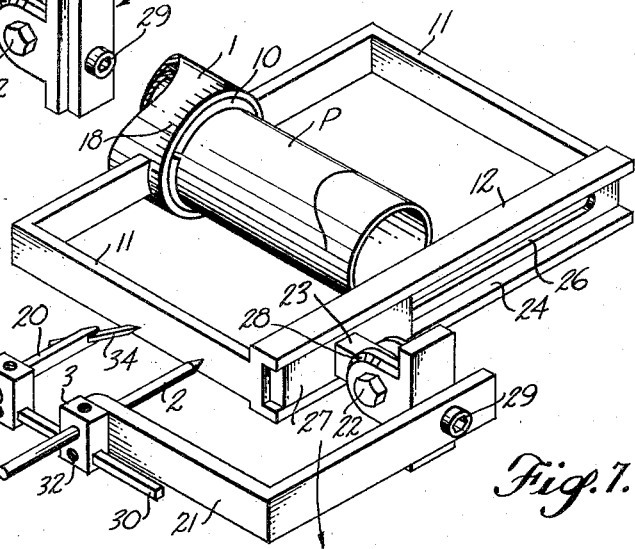
Figure 8:
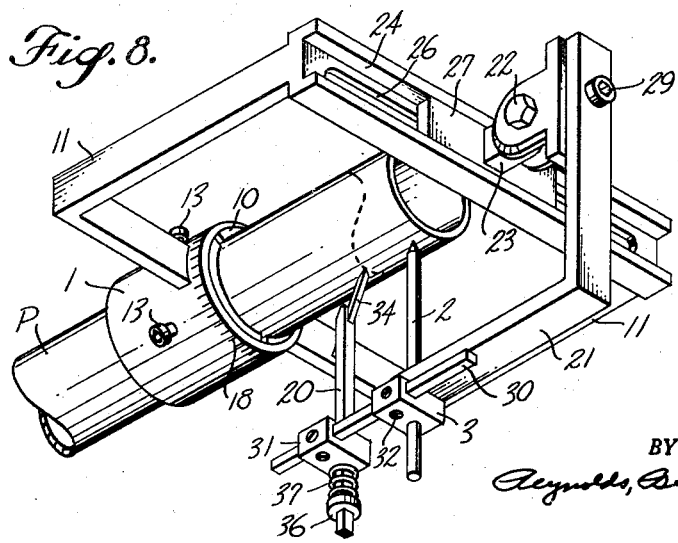
Figure 8 is a bottom perspective view of the apparatus showing parts in positions reversed from their positions shown in Figure 2.

It will be evident that by the procedure described only one-half of the pipe P will be marked, and in order to mark similarly the opposite side of the pipe, it will be necessary either to provide similar apparatus at the opposite side of the plane defined by yoke 11 or to move the delineating mechanism described to the opposite side of the plane of the yoke. In Figures 6, 7 and 8 the procedure for moving the delineating mechanism to the opposite side of the yoke plane is illustrated, while in Figure 12 alternative mechanism is shown in which delineating elements are provided at opposite sides of the plane of the yoke. A further alternative would be to rotate the collar 1 on the pipe P through 180°, but it would be somewhat difficult to secure the collar again on the pipe in a precisely corresponding position turned through a half revolution.

After the intersection edge has been marked on one side of the pipe as described in connection with Figures 1 to 4, inclusive, the bolt 25 securing the boss 23 and block 27 fixed relative to the crossbar 2 may be loosened and the block 27 slid toward one end of the crossbar as shown in Figure 6. A screw 29 securing the bracket 21 to its pivot support may then be loosened and the bracket swung about an axis parallel to the axis of pipe P from the position shown in Figure 6 to the position shown in Figure 8. By moving the block 27 to a position adjacent to one end of the crossbar 12 the pointer 2 and scribe 34 will pass the yoke 11 as shown in Figure 7 if they are retracted somewhat. When the parts have reached the position shown in Figure 8, the screw 29 will be tightened again to hold the bracket in its reversed position. The spreader bar 30 may then be swung about the pointer 2 while pressure is exerted upon the head 36 of bar 20 as described previously, for marking the intersection edge at the other side of the pipe.

For delineating the intersection between a branch pipe and a through pipe in which the axes of the pipe intersect at an angle other than perpendicular, bracket 21 is swung about its pivot 22 into a position such as shown in Figure 9, for example.

The angle through which bracket 21 is tilted about its pivot will correspond to the angle by which the axes of the branch pipe and the through pipe depart from perpendicular. When the bracket has thus been set, the pointer 2 will be moved through its block 3 so that its point lies adjacent to the pipe P for checking, and the bar 20 will be slid through the block 31 and head 36 until the point of the scribe engages the pipe. It is assumed, of course, that the blocks 3 and 31 have been set to the proper spacing corresponding to the radius of the through pipe. Swinging of spreader bar 30 about the axis of pointer 2 to each side of a common plane containing the axis of pipe P and the axis of pointer 2 will now cause the scribe to trace the line of pipe intersection as indicated in broken lines in Figure 9.

When the scribe 34 has been thus moved to mark the line by swinging it about pointer 2 when the bracket 21 is in the solid line position shown in Figure 9, sliding block 27 may be released and slid along crossbar 12 to a position such as shown in Figure 7. The bracket 21 may then be swung about the axis of bolt 29 into the broken line shown in Figure 9, carrying with it the pointer 2 and the scribe element 34. Before rotation of the bracket completely about this axis, the scribe bar and the pointer will be slid outward in their blocks 31 and 33, and the scribe bar will be slid through head 36 sufficiently to clear the opposite side of the pipe P. The block 27 may then be slid back to its central position in which the pointer 2 is again disposed in a diametral plane of pipe P, whereupon the scribe 34 again may be swung about the pointer 2 to scribe the intersection line on the other side of the pipe.

Another type of pipe joint may involve a smaller pipe branching from a larger through pipe in which the axis of the branch pipe is perpendicular to the axis of the through pipe, but is offset from it. To delineate the end of the branch pipe with the apparatus of the present invention under such circumstances the bracket 21 will be placed in the relationship to the slide block 27 shown in Figures 1 and 2, which will dispose the pointer 2 perpendicular to the plane of the yoke 11. The block 31 and the block 3 will then be set on spreader bar 30 so as to locate the point of the scribe 34 and the point of the pointer 2 at a spacing corresponding to the radius of the through pipe.

As shown in Figure 10, block 27 next will be shifted along its groove 24 in the crossbar 12 in one direction or the other from a position in which the axis of pointer 2 intersects the axis of the branch pipe into a position in which the pointer 2 is offset from the axis of the branch pipe a distance designated O in Figure 10, equal to the offset of the branch pipe axis from the through pipe axis. With the scribe pressed against the pipe the spreader bar 30 may now be swung about the pointer 2 through unequal angles from a position in which the spreader bar is parallel to the axis of pipe P to mark on it the joining edge of the branch pipe as indicated in broken lines.

In Figure 11 the intersection delineating apparatus is shown mounted on a through pipe of the largest size with which the apparatus is intended to be used because no shims or filler blocks 10 are required. In this instance the aperture in the through pipe which the branch pipe fits is to be marked, and such branch pipe is assumed to be of smaller size than the through pipe. Also it is assumed that the axes of the branch pipe and of the through pipe will intersect perpendicularly. In such instance the pointer 2 represents the axis of the branch pipe and the blocks 3 and 31 will be spaced apart along the spreader bar 30 a distance such that the points of the pointer 2 and of the scribe 34 will be spaced apart a distance equal to the radius of the branch pipe. As discussed previously, the edge of the pipe intersection may now be marked by pressing the head 36 of the delineating element while the spreader bar 30 is swung about the axis of the pointer 2. In this instance the rotation will be through an angle as near 360° as will be permitted by engagement of the delineating element 20 with opposite sides of the bracket 21.

In Figure 12 the pipe intersection delineating apparatus has a double-ended bracket 21' swingably mounted on a boss 23 by a pivot 22 as in the form of device previously described. In this instance, however, the yoke 11 carries short bar end portions 12' projecting toward each other from opposite sides of the yoke instead of a complete crossbar. In these bar portions are short slots 26' extending lengthwise of them, and these receive bolts 25' securing to the bar sections 12' the opposite ends of a slidable crossbar 27' carrying the boss 23. It will be evident that the movement of such boss transversely of the pipe P, which may be effected by sliding the crossbar supporting bolts 25' in slots 26', is substantially less than in the type of device previously discussed. In this instance, however, since delineating elements 20 are supported from the yoke 21' at opposite sides of the pipe P, the only reason for shifting the crossbar 27' and boss 23 is for delineating a pipe intersection line in which the axes of the two pipes do not intersect, since it is not necessary to swing the bracket 21' through 180° in order to mark both sides of the pipe. For such intersection delineating purpose it should not be necessary to shift the boss 23 in either direction from a location coinciding with a diametral plane of the pipe P exceeding the radius of the collar 1.

If the apparatus shown in Figure 12 is to be used to delineate the pipe intersection of a branch pipe on a through pipe, the pointer 2 and delineating element 20 at only one side of the pipe will be used, as shown in Figure 11. On the other hand, if the pipe intersection is to be delineated on the end of a branch pipe, the delineating elements at both sides of the pipe should be set properly with respect to their respective pointers 2. Each delineating element is then swung about its pointer in order to scribe or otherwise indicate the pipe intersection. The same procedure is followed in setting the spacing between the delineating element and the pointer and moving the delineating element relative to the bracket as previously described, so that it should not be necessary to repeat such discussion.

Still a different embodiment of the invention is shown in Figure 13. In this instance a bracket 21″ having a single arm as described in connection with the type of device shown in Figures 1 and 2 is utilized, except that the length of the bracket portion extending transversely of pipe P is considerably greater than in the forms of device described above. This bracket is mounted by pivot 22 on a boss 23 carried by a slide block 27 movable lengthwise of a crossbar 12 just as in the form of device shown in Figures 1 and 2. The principal advantage of this construction is that by utilizing a long pointer 2 and a long delineating element 20 to engage or be disposed adjacent to the pipe which are retractable, the bracket may be swung from a position projecting beyond one side of the yoke 11′ through the broken line position shown in Figure 13, into a position projecting beyond the opposite side of the yoke when the pointer 2 and the delineating element are retracted sufficiently so that their ends will clear the side bars of the yoke.

In instances where a small branch pipe is to be joined with a relatively much larger through pipe, it will be necessary to space the pointer 2 and delineating element 20 apart a considerable distance, such as indicated in Figure 5 or even farther. In such instances it may be desirable to increase the spacing between the delineating apparatus supporting collar 1 and the crossbar 12. In order to keep the overhang of the apparatus from the collar as small as practicable for conventional use and yet to afford sufficient space for swinging the delineating element where it is spaced a distance from the pointer 2 generally equal to the full length of the spreader bar 30, the yoke 11′ may be made adjustable relative to the collar 1. For this purpose apertures 14 may be provided in opposite sides of the yoke for receiving an anchor bolt 15 extending through the yoke into the end of a yoke supporting bar 16. Such bar has a flange 17 engageable with the side of the yoke bar to hold the yoke in all adjusted positions disposed precisely in a diametral plane of the collar 1.

Because of the provision of a longer bracket 21′, a longer delineating element 20, and a longer pointer 2, so that it is not necessary to shift slide block 27 along crossbar 12 for delineating the pipe intersection at both sides of the pipe, the slot 26 in the crossbar 12 may be much shorter than that required for the apparatus of Figures 1 and 2 if desired. Such slot need be only long enough to enable the boss 23 to be moved either direction from a diametral plane of pipe P a distance substantially equal to the radius of collar 1. The procedure for setting and manipulating the bracket 21′, the pointer 2′ and the delineating element 20 with the type of delineating apparatus shown in Figure 13 will be the same as that described in connection with the other forms of device.

The foregoing description has discussed the marking of a single abutting end of a branch pipe, but it may be desirable to coordinate the pipe intersections at opposite ends of a branch pipe. To facilitate such coordination suitable index marks 18 may be provided about the circumference of collar 1 as shown in Figure 1. One end of the pipe P may then be marked or the intersection otherwise delineated with the collar 1 clamped in position on the pipe P. The pipe may then be reversed end for end so that the opposite end is held in the V-block holder H, and before the yoke 11 is removed it can be leveled by applying to the arms of the yoke extending from collar 1 a level. When the yoke is level the pipe may be clamped in such position, and the yoke removed from the end of the pipe on which the line of intersection has been delineated and placed on the other end of the pipe. The yoke again is leveled on this end of the pipe before it is secured in position and a mark placed on the pipe opposite a reference line of index 18. The yoke collar 1 may then be rotated in one direction or the other through any desired angle as indicated by the index 18 from the reference mark placed on the pipe, and when the desired angle has been set the yoke set screws 13 are secured to clamp the yoke in position. The pipe may then be unsecured and reset to dispose the yoke in a convenient attitude for delineating the other end of the pipe in accordance with the procedure described above.

While the apparatus described above has employed a mounting yoke carried directly by the pipe, making the device portable, the apparatus could be a stationary unit including a table having plates spaced lengthwise of the pipe with V-notches in them cradling the pipe. These plates could be adjustable upward or downward to center various sizes of pipe. The crossbar, such as 12, would be mounted on the end of the table in line with the center line of the plate grooves. Instead of rotating the delineating element supporting bracket relative to the crossbar for marking the opposite side of the pipe after the first side has been marked, the pipe itself may be rotated through 180° while held against endwise movement. If the intersection of the two pipes is other than perpendicular, the bracket would be tilted first in one direction while one side of the pipe is marked, and then in the opposite direction through an equal angle while the other side of the pipe is marked.

In such a stationary machine the reference element 2 could be simply a pivot instead of a pointer and instead of a scribing unit a burning torch could be supported for swinging about the pivot.

If both ends of the pipe were to be cut a center line could be marked on its opposite ends, and when one end of the pipe had been cut or marked appropriately, the pipe could simply be turned end for end and the other center line used as a reference.

I claim as my invention:

1. Pipe joint intersection delineating mechanism comprising a yoke having yoke portions projecting at opposite sides of a first pipe to be incorporated in the joint, means engageable with such first pipe and connected independently to each of said yoke portions, a reference element positionable in a selected relationship to a line representing the axis of the other pipe as incorporated in the joint, means supporting said reference element from said oppositely projecting yoke portions in a selected position relative to such first pipe, a delineating element settable in predetermined relationship to said reference element, and means guiding said delineating element for movement relative to said reference element while in engagement with the first pipe for delineating its line of pipe intersection.

2. Pipe joint intersection delineating mechanism comprising a generally planar yoke having coplanar yoke portions projecting oppositely outward beyond opposite sides of a first pipe to be incorporated in the joint, means engageable with such first pipe and connected dependently to each of said yoke portions, a reference element positionable in a selected relationship to a line representing the axis of the other pipe as incorporated in the joint, a bracket carried by said yoke and supporting said reference element at one side of the plane of said yoke, a delineating element, and means carrying said delineating element in spaced relationship to said reference element and pivotally supported from said yoke for swinging about said reference element while said delineating element is in engagement with the first pipe for delineating its line of pipe intersection.

3. Pipe joint intersection delineating mechanism comprising a generally planar yoke having coplanar yoke portions projecting oppositely outward beyond opposite sides of a first pipe to be incorporated in the joint, means engageable with such first pipe and connected independently to each of said yoke portions, a reference element positioned in a selected relationship to a line representing the axis of the other pipe as incorporated in the joint, a bracket supporting said reference element at one side of the plane of said yoke, pivot means supporting said bracket from said yoke and guiding said bracket for swinging about an axis perpendicularly intersecting the axis of such first pipe, a delineating element, and means carrying said delineating element in spaced relationship to said reference element and pivotally supported from said yoke for swinging about said reference element while said delineating element is in engagement with the first pipe for delineating its line of pipe intersection.

4. Pipe joint intersection delineating mechanism comprising a generally planar yoke having coplanar yoke portions projecting oppositely outward beyond opposite sides of a first pipe to be incorporated in the joint, means engageable with such first pipe and connected independently to each of said yoke portions, a pointer positionable along a line representing the axis of the other pipe as incorporated in the joint, means supporting said pointer from said yoke in a position extending transversely of such first pipe, a delineating element, means interconnecting said delineating element and said pointer in spaced relationship, and means supporting said interconnecting means for rotation about the axis of said pointer while in engagement with the first pipe for delineating its line of pipe intersection.

5. Pipe joint intersection delineating mechanism comprising a generally planar yoke having coplanar yoke portions projecting oppositely outward beyond opposite sides of a first pipe to be incorporated in the joint, means engageable with such first pipe and connected independently to each of said yoke portions, a pointer positionable along a line representing the axis of the other pipe as incorporated in the joint, supporting means supporting said pointer in a position extending transversely of such first pipe, pivot means mounting said supporting means on said yoke for swinging about an axis extending transversely of said pointer, a delineating element, means interconnecting said delineating element and said pointer in spaced relationship, and means supporting said interconnecting means for rotation about the axis of said pointer while in engagement with the first pipe for delineating its line of pipe intersection.

6. Pipe joint intersection delineating mechanism comprising a generally planar yoke, a collar encircling a first pipe to be incorporated in the joint, secured thereto and supporting said yoke with coplanar yoke portions projecting oppositely outward beyond opposite sides of such pipe, a pointer positionable along a line representing the axis of the other pipe as incorporated in the joint, a bracket supporting said pointer in a position extending transversely of such first pipe, pivot means mounting said bracket on said yoke for swinging about an axis extending transversely of said pointer, a delineating element, a spreader bar interconnecting said delinating element and said pointer and variable in effective length to alter the spacing between said delineating element and said pointer, and means supporting said spreader bar for rotation about the axis of said pointer while in engagement with the first pipe for delineating its line of pipe intersection.

7. Pipe joint intersection delineating mechanism comprising a yoke including a crossbar, means operable to support said yoke from a first pipe to be incorporated in the joint in a position disposing said crossbar beyond and extending substantially diametrically transversely across the end of the pipe, a reference element positionable in a selected relationship to a line representing the axis of the other pipe as incorporated in the joint, a delineating element settable in a predetermined relationship to said reference element, means supporting said delineating element and said reference element from said yoke at one side of said first pipe including a block slidable lengthwise of said crossbar and carrying said reference element and said delineating element for movement of said reference element into a position offset from the axis of the first pipe in a direction lengthwise of said crossbar, and means guiding said delineating element for movement relative to said reference element and the first pipe for delineating its line of pipe intersection.

8. Pipe joint intersection delineating mechanism comprising a yoke, means operable to support said yoke from a first pipe to be incorporated in the joint with yoke portions projecting at opposite sides of such pipe, a reference element positionable in a selected relationship to a line representing the axis of the other pipe as incorporated in the joint, a delineating element settable in a predetermined relationship to said reference element, means supporting said delineating element and said reference element from said oppositely projecting yoke portions at one side of such first pipe, means operable to guide said delineating element and said reference element for swinging relative to said yoke to the other side of such first pipe, and means guiding said delineating element for movement relative to said reference element and the first pipe for delineating its line of pipe intersection.

9. The mechanism defined in claim 8, in which the yoke includes a crossbar beyond and extending transversely across the end of the first pipe, and a block slidable lengthwise of said crossbar and carrying the reference element and delineating element.

10. Pipe joint intersection delineating mechanism comprising a generally planar yoke, means operable to support said yoke from a first pipe to be incorporated in the joint with coplanar yoke portions projecting oppositely outward beyond opposite sides of such pipe, a bracket carried by said oppositely projecting yoke portions and extending transversely of the plane of said yoke beyond opposite sides thereof, two reference elements positionable in a selected relationship to a line representing the axis of the other pipe as incorporated in the joint and mounted on said bracket one on each side of the plane of said yoke, two delineating elements, means supporting said delineating elements one adjacent to each of said reference elements, and means guiding each delineating element for movement relative to the adjacent reference element and the first pipe for delineating its line of pipe intersection at opposite sides of said yoke.

11. The pipe joint intersecting delineating mechanism defined in claim 10, and pivot means supporting said bracket from said yoke portions and operable to guide the bracket, the two reference elements and the two delineating elements for conjoint tilting about an axis disposed diametrically of the first pipe.

12. Pipe joint intersection delineating mechanism comprising a reference element positionable in a selected relationship to a line representing the axis of a first pipe as incorporated in the joint, means operable to support said reference element from the other pipe to be incorporated in the joint and including pivot means disposed beyond the end of and in registry with such other pipe and operable to guide said reference element for tilting about an axis in a diametral plane of such other pipe and parallel to the axis of such other pipe, a delineating element settable in predetermined relationship to said reference element, and means guiding said delineating element for movement relative to said reference element for delineating the line of pipe intersection on such other pipe.

13. The pipe joint intersection delineating mechanism defined in claim 12, in which the means supporting the reference element from the pivot means includes additional pivot means substantially in a diametral plane of such other pipe and supporting the reference element for swinging about an axis intersecting the axis of the first pivot means.

14. Pipe joint intersection delineating mechanism comprising a reference element positionable in alignment with a line representing the axis of a first pipe as incorporated in the joint, universal pivot means disposed substantially in a diametral plane of the other pipe to be incorporated in the joint and supporting said reference element for swinging about an axis perpendicularly intersecting the axis of such other pipe and also about an axis intersecting both the first axis of the pivot means and the axis of such first pipe, a delineating element, and means guiding said delineating element for movement relative to said reference element for delineating the line of pipe intersection on such other pipe.

15. Pipe joint intersection delineating mechanism comprising a delineating element, a reference axis element positionable along a line representing the axis of one pipe as incorporated in the joint, means supporting said delineating element and guiding it for arcuate movement about the axis of said reference axis element, and pivot means disposed in alignment with the length of the other pipe to be incorporated in the joint, having its pivotal axis directed transversely of such other pipe and tiltably supporting said reference axis element at one side of such other pipe for varying the angle between the axis of such reference axis element and the axis of such other pipe.

16. Pipe joint intersection delineating mechanism comprising two aligned reference elements positionable along a line representing the axis of a first pipe as incorporated in the joint and disposed respectively at opposite sides of the other pipe to be incorporated in the joint, supporting means interconnecting and supporting both of said reference elements at opposite sides of such other pipe, pivot means disposed in alignment with the length of such other pipe, having its pivotal axis directed transversely of such other pipe and tiltably mounting said supporting means for conjoint tilting of said reference elements to vary the angle between the line joining said reference elements and the axis of such other pipe, two delineating elements, means supporting said delineating elements one adjacent to each of said reference elements, and means guiding each delineating element for movement relative to the adjacent reference element and the line joining said reference elements for delineating the line of pipe intersection at opposite sides of such other pipe.

References Cited in the file of this patent

UNITED STATES PATENTS

| | | |
|---|---|---|
| 866,866 | Jottrand | Sept. 24, 1907 |
| 1,660,616 | James | Feb. 28, 1928 |
| 1,907,956 | Gerber | May 9, 1933 |
| 1,991,117 | Porteous et al. | Feb. 12, 1935 |
| 2,326,447 | Enderson | Aug. 10, 1943 |
| 2,389,286 | Watkins | Nov. 20, 1945 |
| 2,497,853 | Arnold et al. | Feb. 21, 1950 |
| 2,623,285 | Marinovich | Dec. 30, 1952 |
| 2,625,741 | Jesonis | Jan. 20, 1953 |